(12) United States Patent
Iijima

(10) Patent No.: US 9,134,057 B2
(45) Date of Patent: Sep. 15, 2015

(54) REFRIGERATION CYCLE AND CONDENSER WITH SUPERCOOLING UNIT

(75) Inventor: Kenji Iijima, Kumagaya (JP)

(73) Assignee: VALEO JAPAN CO. LTD., Kumagaya-Shi (JP)

( * ) Notice: Subject to any disclaimer, the term of this patent is extended or adjusted under 35 U.S.C. 154(b) by 351 days.

(21) Appl. No.: 13/880,693

(22) PCT Filed: Oct. 7, 2011

(86) PCT No.: PCT/JP2011/005651
§ 371 (c)(1), (2), (4) Date: Jul. 30, 2013

(87) PCT Pub. No.: WO2012/053157
PCT Pub. Date: Apr. 26, 2012

(65) Prior Publication Data
US 2013/0298596 A1    Nov. 14, 2013

(30) Foreign Application Priority Data
Oct. 22, 2010    (JP) .................................. 2010-237624

(51) Int. Cl.
*F25B 1/00* (2006.01)
*F25B 39/04* (2006.01)
(Continued)

(52) U.S. Cl.
CPC ................ *F25B 39/04* (2013.01); *F25B 40/00* (2013.01); *B60H 2001/3266* (2013.01); *B60H 2001/3276* (2013.01); *F25B 40/02* (2013.01); *F25B 2400/121* (2013.01)

(58) Field of Classification Search
CPC ............ F25B 1/10; F25B 13/00; F25B 40/00; F25B 2400/13; F25B 41/062; F25B 41/04
USPC .......................... 62/197, 225, 228.3, 498, 513
See application file for complete search history.

(56) References Cited

U.S. PATENT DOCUMENTS

| | | | |
|---|---|---|---|
| 5,224,358 A | 7/1993 | Yamanaka et al. | |
| 2006/0080989 A1* | 4/2006 | Aoki et al. | 62/324.4 |

(Continued)

FOREIGN PATENT DOCUMENTS

| | | |
|---|---|---|
| JP | 2000146311 A | 5/2000 |
| JP | 2003106688 A | 4/2003 |

(Continued)

OTHER PUBLICATIONS

English abstract for JP 2000146311 extracted from espacenet.com database on Aug. 28, 2013, 2 pages.

(Continued)

*Primary Examiner* — Melvin Jones
(74) *Attorney, Agent, or Firm* — Howard & Howard Attorneys PLLC (57) ABSTRACT

A refrigeration cycle 1 is constituted by joining at least a compressor 2, a condenser 3, a decompression and expansion device 4, and an evaporator 5 to each other by a pipe 6. The condenser 3 is formed of a condenser with a supercooling part including a condensing part 7 and a supercooling part 8. The refrigeration cycle 1 further includes an internal heat exchanger 25. A rate at which the supercooling part 8 occupies with respect to the whole condenser 3 is set to a value which falls within a range of 3% to 9% when the heat exchange efficiency of the internal heat exchanger 25 falls within a range of 25% to 75%.

12 Claims, 6 Drawing Sheets

(51) Int. Cl.
*F25B 40/00* (2006.01)
*B60H 1/32* (2006.01)
*F25B 40/02* (2006.01)

(56) References Cited

U.S. PATENT DOCUMENTS

2007/0074536 A1* 4/2007 Bai .................................. 62/513
2007/0107451 A1* 5/2007 Sakurai et al. ................. 62/228.3

FOREIGN PATENT DOCUMENTS

| JP | 2007298273 A | 11/2004 |
| JP | 2005226885 A | 8/2005 |
| JP | 2010127498 A | 6/2010 |

OTHER PUBLICATIONS

English language abstract and translation for JP 2003106688 extracted from PAJ database on Aug. 28, 2013, 20 pages.
English language abstract and translation for JP 2005226885 extracted from PAJ database on Aug. 28, 2013, 23 pages.
English language abstract and translation for JP 2007298273 extracted from PAJ database on Aug. 28, 2013, 28 pages.
English language abstract and translation for JP 2010127498 extracted from PAJ database on Aug. 28, 2013, 23 pages.
International Search Report for Application No. PCT/JP2011/005651 dated Oct. 28, 2011, 7 pages.

* cited by examiner

Kind of refrigerant : R134a

| | vehicle speed | heat exchange efficiency (%) of internal heat exchanger | | |
|---|---|---|---|---|
| | | 25 | 50 | 75 |
| high load (35°C 50%) | Idle | 9 | 5 | 3 |
| | 40Km/h | 7 | 6 | 4 |
| | 100Km/h | 9 | 7 | 6 |
| low load (25°C 50%) | Idle | 8 | 5 | 3 |
| | 40Km/h | 6 | 5 | 5 |

FIG.4

Kind of refrigerant : HFO-1234yf

|  | vehicle speed | heat exchange efficiency (%) of internal heat exchanger | | |
| --- | --- | --- | --- | --- |
|  |  | 25 | 50 | 75 |
| high load ( 35°C 50% ) | Idle | 14 | 11 | 9 |
|  | 40Km/h | 11 | 9 | 8 |
|  | 100Km/h | 11 | 10 | 8 |
| low load ( 25°C 50% ) | Idle | 8 | 6 | 3 |
|  | 40Km/h | 7 | 7 | 5 |

FIG.6

REFRIGERATION CYCLE AND CONDENSER WITH SUPERCOOLING UNIT

RELATED APPLICATIONS

This application is the National Stage of International Patent Application No. PCT/JP2011/005651, filed on Oct. 7, 2011, which claims priority to and all the advantages of Japanese Patent Application No. JP 2011-237624, filed on Oct. 22, 2010, the content of which is incorporated herein by reference.

TECHNICAL FIELD

The present invention relates to a refrigeration cycle which includes both a condenser with a supercooling part and an internal heat exchanger, and more particularly to a refrigeration cycle which is preferably used for vehicle air conditioning and a condenser with a supercooling part which constitutes the refrigeration cycle.

BACKGROUND ART

In a refrigeration cycle for vehicle air conditioning, as disclosed in patent literature 1 and patent literature 2, for example, there have been already known the inventions where, to enhance the operation efficiency of the refrigeration cycle, that is, aiming at the acquisition of a higher refrigerating capacity with smaller power of a compressor, a constitutional part which includes a new function is added to a predetermined air conditioning unit or a new air conditioning unit.

Out of these patent literatures, patent literature 1 discloses a heat exchanger which functions as a condenser constituting a refrigeration cycle, wherein the heat exchanger is constituted of a flat tube, corrugated fins, a first tank and a second tank. A refrigerant upstream side of a core formed of the flat tube and the corrugated fins constitutes a condensing part, a refrigerant downstream side of the core constitutes a supercooling part, and a gas/liquid separation part is arranged between the condensing part and the supercooling part. A refrigerant which is condensed by passing through the condensing part is further cooled (supercooled) thus enhancing a cooling ability of a refrigeration device. In patent literature 1, there is also described an idea where a rate at which a heat radiation area of the supercooling part occupies with respect to a heat radiation area of the whole heat exchanger is set to a value which falls within a fixed range (10% to 30% in the patent literature 1).

Further, in patent literature 2, there is described the constitution where an internal heat exchanger which performs a heat exchange between a high-pressure refrigerant flown out from a condenser and a low-pressure refrigerant flown out from an evaporator is arranged on a path of a refrigeration cycle.

CITATION LIST

Patent Literature

PTL 1: JP-A-2000-146311
PTL 2: JP-A-2010-127498

SUMMARY OF INVENTION

Technical Problem

When a rate at which a heat radiation area of the supercooling part occupies with respect to a heat radiation area of the heat exchanger with a supercooling part (hereinafter referred to as condenser for the sake of convenience) described in patent literature 1 is increased, a heat radiation amount of the condenser is increased. In this case, it is also necessary to increase power for operating a compressor which constitutes a refrigeration cycle. Further, an increase rate of power of the compressor is larger than an increase rate of endothermic energy amount of an evaporator. Accordingly, as indicated in an illustration portion of a Q/L ratio in FIG. 11 of patent literature 1, it has been known that a COP (Coefficient of Performance) expressed by a calculation formula of refrigerating capacity (Q)/power (L) of compressor has a local maximum point (maximum efficiency point).

In view of the above, it may be possible to provide the constitution where a refrigeration cycle also includes an internal heat exchanger described in patent literature 2, for example, besides a condenser with a supercooling part. When the internal heat exchanger is combined with the condenser as an additional unit, a refrigerant cooled by the condenser is further cooled also by a heat exchange between a high-pressure refrigerant flown out from the condenser and a low-pressure refrigerant flown out from an evaporator which is performed by the internal heat exchanger. Accordingly, the internal heat exchanger also performs a function of the supercooling part and hence, a rate of the supercooling part in the condenser can be relatively decreased whereby it is possible to realize the reduction in an amount of refrigerant to be filled and the enhancement of the heat radiation performance due to the relative expansion of a condensing part in the condenser. Further, due to the provision of the internal heat exchanger, an enthalpy which a refrigerant flowing into the evaporator possesses can be reduced so that a refrigerating ability of the refrigeration cycle can be also enhanced.

Here, when the refrigeration cycle includes the internal heat exchanger, an enthalpy which a refrigerant sucked in by a compressor possesses is also increased (a temperature or a pressure is increased relatively) due to the internal heat exchanger and hence, a power amount of the compressor is increased. Accordingly, to realize an object of acquiring a higher cooling capacity with smaller power even when the refrigeration cycle includes the internal heat exchanger, it is necessary to set an optimum rate at which the supercooling part occupies with respect to the condenser again by taking into account both the power of the compressor which is the denominator and the refrigerating capacity which is a numerator in the above-mentioned calculation formula of the coefficient of performance (COP) change.

On the other hand, as a kind of refrigerant which flows in a refrigeration cycle for vehicle air conditioning, an R134a refrigerant is often used. However, a refrigerant which exhibits a low global warming potential (GWP) such as an HFO-1234yf, that is, a low GWP refrigerant has been developed recently, and it is expected that such a low GWP refrigerant will be adopted. However, the low GWP refrigerant is relatively costly and hence, there has become a greater demand for the reduction of an amount of low GWP refrigerant to be filled in a refrigeration cycle from a viewpoint of lowering a cost.

Accordingly, it is an object of the invention to provide a refrigeration cycle where, when an internal heat exchanger is adopted by the refrigeration cycle in addition to a condenser with a supercooling part, a rate at which the supercooling part occupies with respect to the whole condenser is set again such that an optimum sub cool can be acquired as the whole refrigeration cycle and an amount of refrigerant to be filled can be relatively reduced, and a condenser with a supercooling part which constitutes the refrigeration cycle.

Solution to Problem

The invention is directed to a refrigeration cycle which is constituted by suitably joining at least a compressor which compresses a refrigerant, a condenser which condenses the compressed refrigerant, a decompression and expansion device which decompresses and expands the condensed refrigerant, and an evaporator which evaporates the decompressed and expanded refrigerant to each other by piping, wherein the condenser is formed of a condenser with a supercooling part, the condenser including a condensing part which is arranged on an upstream side in the flow of the refrigerant and condenses the refrigerant by cooling, and a supercooling part which is arranged downstream of the condensing part in the flow of the refrigerant and further cools the refrigerant, the refrigeration cycle further includes an internal heat exchanger which includes a first heat exchanging part through which the refrigerant introduced into the decompression and expansion device from the condenser flows, and a second heat exchanging part through which the refrigerant introduced into a suction side of the compressor from the evaporator passes, and performs a heat exchange between a relatively high-temperature refrigerant which flows through the first heat exchanging part and a relatively low-temperature refrigerant which flows through the second heat exchanging part, and a rate at which the supercooling part occupies with respect to the whole condenser is set based on a maximum efficiency point of a coefficient of performance of the refrigeration cycle introduced based on an outside air load, a vehicle speed and a heat exchange efficiency which the internal heat exchanger has (Claim 1).

The refrigeration cycle according to the invention is characterized in that the maximum efficiency points of the coefficient of performance of the refrigeration cycle are introduced respectively based on a plurality of different outside air loads, a plurality of different vehicle speeds and a plurality of heat exchange efficiencies which the internal heat exchanger has respectively, and the rate at which the supercooling part occupies with respect to the whole condenser is set based on a value which falls within a range of respectively introduced maximum efficient points (Claim 2).

Here, the plurality of different outside air loads include a condition where an outside air temperature is 25° C. and a relative humidity is 50% at a relatively low load and a condition where an outside air temperature is 35° C. and a relative humidity is 50% at a relatively high load, the plurality of different vehicle speeds include a condition where a driving state is an idling state and the vehicle speed is 40 km/h at the relatively low load and a condition where the driving state is an idling state and the vehicle speed is 40 km/h and 100 km/h at the relatively high load, and the plurality of different heat exchange efficiencies which the internal heat exchanger has respectively include a condition where the heat exchange efficiency is 25%, a condition where the heat exchange efficiency is 50% and a condition where the heat exchange efficiency is 75%, and assuming a refrigerant temperature value on an inlet side of the first heat exchanging part as $T1$, a refrigerant temperature value on an outlet side of the first heat exchanging part as $T2$, a refrigerant temperature value on an outlet side of the second heat exchanging part as $T3$, and a refrigerant temperature value on an inlet side of the second heat exchanging part as $T4$, the heat exchange efficiency is introduced by $100 \times (T3-T4)/(T1-T4)$ (Claim 3). The idling state means 0 km/h.

The refrigeration cycle according to the invention is characterized in that an R134a refrigerant or an HFO-1234yf refrigerant is used as the refrigerant which flows through the refrigeration cycle (Claim 4).

The invention is also directed to a refrigeration cycle which is constituted by suitably joining at least a compressor which compresses a refrigerant, a condenser which condenses the compressed refrigerant, a decompression and expansion device which decompresses and expands the condensed refrigerant, and an evaporator which evaporates the decompressed and expanded refrigerant to each other by piping, wherein an R134a refrigerant is used as the refrigerant which flows through the refrigeration cycle, the condenser is formed of a condenser with a supercooling part, the condenser including a condensing part which is arranged on an upstream side in the flow of the refrigerant and condenses the refrigerant by cooling, and a supercooling part which is arranged downstream of the condensing part in the flow of the refrigerant and further cools the refrigerant, the refrigeration cycle further includes an internal heat exchanger which includes a first heat exchanging part through which the refrigerant introduced into the decompression and expansion device from the condenser flows, and a second heat exchanging part through which the refrigerant introduced into a suction side of the compressor from the evaporator passes, and performs a heat exchange between a relatively high-temperature refrigerant which flows through the first heat exchanging part and a relatively low-temperature refrigerant which flows through the second heat exchanging part, and assuming a value of the heat exchange efficiency of the internal heat exchanger as $X$ and a value of a rate at which the supercooling part occupies with respect to the condenser as $Y$, the rate of the supercooling part is set to be expressed by $-(3/50)X+15/2 \leq Y \leq -(3/50)X+21/2$ (Claim 5).

The invention is also directed to a refrigeration cycle which is constituted by suitably joining at least a compressor which compresses a refrigerant, a condenser which condenses the compressed refrigerant, a decompression and expansion device which decompresses and expands the condensed refrigerant, and an evaporator which evaporates the decompressed and expanded refrigerant to each other by piping, wherein an HFO-1234yf refrigerant is used as the refrigerant which flows through the refrigeration cycle, the condenser is formed of a condenser with a supercooling part, the condenser including a condensing part which is arranged on an upstream side in the flow of the refrigerant and condenses the refrigerant by cooling, and a supercooling part which is arranged downstream of the condensing part in the flow of the refrigerant and further cools the refrigerant, the refrigeration cycle further includes an internal heat exchanger which includes a first heat exchanging part through which the refrigerant introduced into the decompression and expansion device from the condenser flows, and a second heat exchanging part through which the refrigerant introduced into a suction side of the compressor from the evaporator passes, and performs a heat exchange between a relatively high-temperature refrigerant which flows through the first heat exchanging part and a relatively low-temperature refrigerant which flows through the second heat exchanging part, and assuming a value of the heat exchange efficiency of the internal heat exchanger as $X$ and a value of a rate at which the supercooling part occupies with respect to the condenser as $Y$, a value of the rate of the supercooling part is set to be expressed by $-(4/50)X+18/2 \leq Y \leq -(5/50)X+33/2$ (Claim 6).

The invention is also directed to a refrigeration cycle which is constituted by suitably joining at least a compressor which compresses a refrigerant, a condenser which condenses the compressed refrigerant, a decompression and expansion device which decompresses and expands the condensed refrigerant, and an evaporator which evaporates the decompressed and expanded refrigerant to each other by piping, wherein an R134a refrigerant is used as the refrigerant which flows through the refrigeration cycle, the condenser is formed of a condenser with a supercooling part, the condenser including a condensing part which is arranged on an upstream side in the flow of the refrigerant and condenses the refrigerant by cooling, and a supercooling part which is arranged downstream of the condensing part in the flow of the refrigerant and further cools the refrigerant, the refrigeration cycle further includes an internal heat exchanger which includes a first heat exchanging part through which the refrigerant introduced into the decompression and expansion device from the condenser flows, and a second heat exchanging part through which the refrigerant introduced into a suction side of the compressor from the evaporator passes, and performs a heat exchange between a relatively high-temperature refrigerant which flows through the first heat exchanging part and a relatively low-temperature refrigerant which flows through the second heat exchanging part, and a rate at which the supercooling part occupies with respect to the whole condenser falls within a range of 3% to 9% when the heat exchange efficiency of the internal heat exchanger falls within a range of 25% to 75% (Claim 7).

The invention is also directed to a refrigeration cycle which is constituted by suitably joining at least a compressor which compresses a refrigerant, a condenser which condenses the compressed refrigerant, a decompression and expansion device which decompresses and expands the condensed refrigerant, and an evaporator which evaporates the decompressed and expanded refrigerant to each other by piping, wherein an HFO-1234yf refrigerant is used as the refrigerant which flows through the refrigeration cycle, the condenser is formed of a condenser with a supercooling part, the condenser including a condensing part which is arranged on an upstream side in the flow of the refrigerant and condenses the refrigerant by cooling, and a supercooling part which is arranged downstream of the condensing part in the flow of the refrigerant and further cools the refrigerant, the refrigeration cycle further includes an internal heat exchanger which includes a first heat exchanging part through which the refrigerant introduced into the decompression and expansion device from the condenser flows, and a second heat exchanging part through which the refrigerant introduced into a suction side of the compressor from the evaporator passes, and performs a heat exchange between a relatively high-temperature refrigerant which flows through the first heat exchanging part and a relatively low-temperature refrigerant which flows through the second heat exchanging part, and a rate at which the supercooling part occupies with respect to the whole condenser falls within a range of 3% to 14% when the heat exchange efficiency of the internal heat exchanger falls within a range of 25% to 75% (Claim 8).

The invention is also directed to a condenser with a supercooling part for condensing a compressed refrigerant, the condenser constituting a refrigeration cycle by suitably connecting at least a compressor which compresses the refrigerant, a decompression and expansion device which decompresses and expands the condensed refrigerant, an evaporator which evaporates the decompressed and expanded refrigerant, and an internal heat exchanger which includes a first heat exchanging part and a second heat exchanging part, and performs a heat exchange between a relatively high-temperature refrigerant which flows through the first heat exchanging part and a relatively low-temperature refrigerant which flows through the second heat exchanging part to each other by piping, wherein the condenser includes a condensing part which is arranged on an upstream side in the flow of the refrigerant and condenses the refrigerant by cooling, and a supercooling part which is arranged downstream of the condensing part in the flow of the refrigerant and further cools the refrigerant, and maximum efficiency points of a coefficient of performance of the refrigeration cycle are respectively introduced based on a plurality of different outside loads, a plurality of different vehicle speeds and a plurality of heat exchange efficiencies which the internal heat exchanger has respectively, and the rate at which the supercooling part occupies with respect to the whole condenser is set based on values which fall within ranges of respectively introduced maximum efficient points (Claim 9).

The invention is also directed to a condenser with a supercooling part for condensing a compressed refrigerant, the condenser constituting a refrigeration cycle by suitably connecting at least a compressor which compresses the refrigerant, a decompression and expansion device which decompresses and expands the condensed refrigerant, an evaporator which evaporates the decompressed and expanded refrigerant, and an internal heat exchanger which includes a first heat exchanging part and a second heat exchanging part, and performs a heat exchange between a relatively high-temperature refrigerant which flows through the first heat exchanging part and a relatively low-temperature refrigerant which flows through the second heat exchanging part to each other by piping, wherein the condenser includes a condensing part which is arranged on an upstream side in the flow of the refrigerant and condenses the refrigerant by cooling, and a supercooling part which is arranged downstream of the condensing part in the flow of the refrigerant and further cools the refrigerant, and a rate at which the supercooling part occupies with respect to the whole condenser is set to a value which falls within a range of 3% to 9% when an R134a refrigerant is used as the refrigerant which flows through the refrigeration cycle (Claim 10).

The invention is also directed to a condenser with a supercooling part for condensing a compressed refrigerant, the condenser constituting a refrigeration cycle by suitably connecting at least a compressor which compresses the refrigerant, a decompression and expansion device which decompresses and expands the condensed refrigerant, an evaporator which evaporates the decompressed and expanded refrigerant, and an internal heat exchanger which includes a first heat exchanging part and a second heat exchanging part, and performs a heat exchange between a relatively high-temperature refrigerant which flows through the first heat exchanging part and a relatively low-temperature refrigerant which flows through the second heat exchanging part to each other by piping, wherein the condenser includes a condensing part which is arranged on an upstream side in the flow of the refrigerant and condenses the refrigerant by cooling, and a supercooling part which is arranged downstream of the condensing part in the flow of the refrigerant and further cools the refrigerant, and a rate at which the supercooling part occupies with respect to the whole condenser is set to a value which falls within a range of 3% to 14% when an HFO-1234yf refrigerant is used as the refrigerant which flows through the refrigeration cycle (Claim 11).

Advantageous Effects of Invention

As set forth above, according to these inventions, the refrigeration cycle also includes an internal heat exchanger in conformity with the condenser with a supercooling part. Due to such a constitution, a rate at which the supercooling part occupies with respect to the whole condenser can be made relatively small and hence, a condensing part of the condenser can be made relatively large along with the reduction of the rate of the supercooling part whereby the heat radiation function of the condenser can be enhanced. An amount of refrigerant to be filled can be also reduced. Accordingly, an environmental load can be reduced, and it is particularly also possible to reduce a cost of the refrigeration cycle when a relatively expensive HFO-1234yf refrigerant is used as the refrigerant.

According to these inventions, in the refrigeration cycle which includes the condenser with a supercooling part and the internal heat exchanger, even when the internal heat exchanger is provided, the rate at which the supercooling part occupies with respect to the whole condenser is set to a value which falls within a range where a coefficient of performance indicative of refrigeration efficiency can acquire a maximum efficiency point under various conditions. Accordingly, the refrigeration cycle can acquire higher refrigeration efficiency with less power of the compressor.

According to the invention called for in claim 10 and claim 11, even when the maximum efficiency point of the coefficient of performance of the refrigeration cycle is not obtained based on the outside air load, the vehicle speed and the heat exchange efficiency of the internal heat exchanger, the high coefficient of performance can be acquired by setting the rate at which the supercooling part occupies with respect to the whole condenser to a value which falls within the range described in claim 10 or claim 11.

DESCRIPTION OF EMBODIMENTS

Hereinafter, an embodiment of the invention is explained in conjunction with attached drawings.

Figure 1:
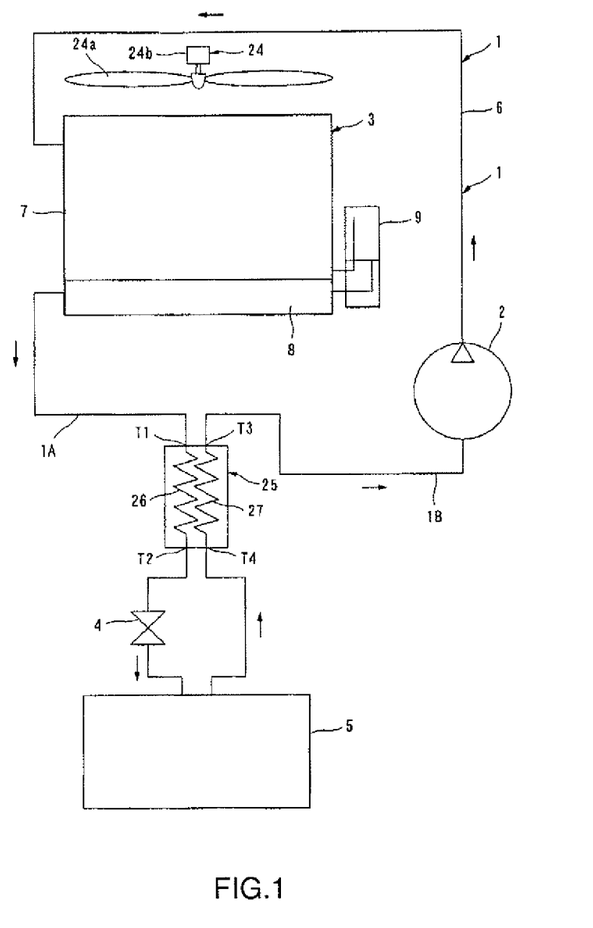
FIG. 1 is a schematic view showing the whole constitution of a refrigeration cycle which includes both a condenser with a supercooling part according to the invention and an internal heat exchanger.

FIG. 1 shows one example of a refrigeration cycle 1 according to the invention. The refrigeration cycle 1 is constituted of at least: a compressor 2 which compresses a refrigerant; a condenser 3 which condenses the compressed refrigerant; a decompression and expansion device 4 which decompresses and expands the condensed refrigerant; and an evaporator 5 which evaporates the decompressed and expanded refrigerant.

Figure 2:
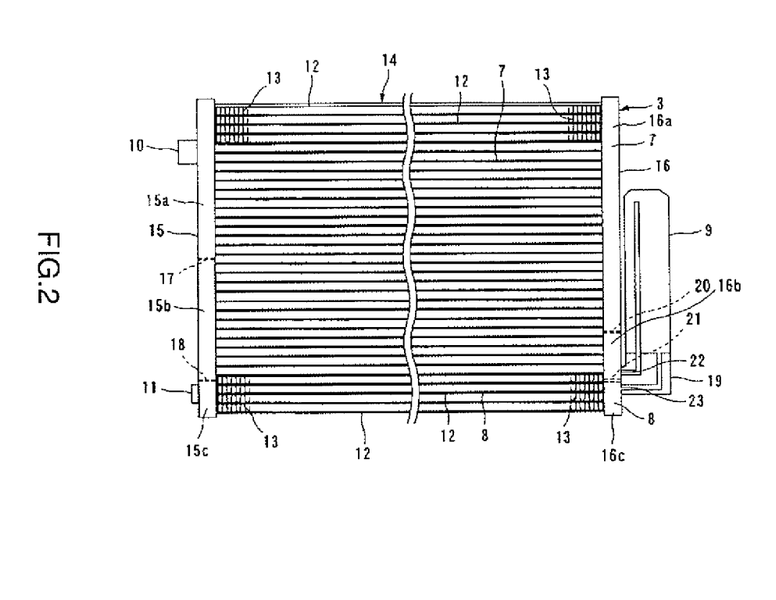
FIG. 2 is an explanatory view showing one example of the condenser with a supercooling part used in the above-mentioned refrigeration cycle.

The condenser 3 is formed of, as shown in FIG. 1 and FIG. 2, a condenser with a supercooling part which includes a condensing part 7, a supercooling part 8 and a gas/liquid separation part (also referred to as "modulator", this definition being also applicable hereinafter) 9.

To explain one example of the condenser 3 in conjunction with FIG. 2 in detail, the condenser 3 includes a core 14 which is formed by laminating a plurality of tubes 12 and a plurality of fins 13 alternately in a suitable manner, and tanks 15, 16 which are connected with the tubes 12 in the form where the tanks 15, 16 are communicated with opening portions on both ends of the tubes 12 in the longitudinal direction. An inlet portion 10 and an outlet portion 11 are formed on the tank 15 at suitable positions. Partition portions 17, 18 are formed between the inlet portion 10 and the outlet portion 11 thus dividing the tank 15 into tank portions 15a, 15b, 15c. The tank 16 is connected to the gas/liquid separation part 9 by way of a connector 19. A partition portion 20 is formed on a more inlet portion 10 side than the connector 19 and an outflow portion 22 to the gas/liquid separation part 9, and a partition portion 21 is formed between the outflow portion 22 and the connector 19 and an inflow portion 23 from the gas/liquid separation part 9 thus dividing the tank 16 into tank portions 16a, 16b, 16c.

That is, in this condenser 3, a range of the core 14 sandwiched between the tank portions 15a, 15b and the tank portions 16a, 16b constitutes the condensing part 7, and a range of the core 14 sandwiched between the tank portion 15c and the tank portion 16c constitutes the supercooling part 8.

Due to such a constitution, in the condenser 3, a vaporized refrigerant supplied to the tank portion 15a and, eventually, the condensing part 7 from the compressor 2 through the inlet portion 10 is cooled by the condensing part 7 so that the vaporized refrigerant is converted into a liquid refrigerant. Thereafter, the liquid refrigerant is supplied to the gas/liquid separation part 9, and the liquid refrigerant is separated into a vaporized refrigerant and a liquid refrigerant (partially including a vaporized refrigerant) by the gas/liquid separation part 9. Further, the liquid refrigerant can be cooled by making the liquid refrigerant which passes through the condensing part 7 and the gas/liquid separation part 9 pass through the supercooling part 8 so that the refrigerant discharged from the outlet portion 11 of the condenser 3 is formed into a liquid refrigerant at a rate of approximately 100%.

The condenser 3 may not have the structure where the condensing part 7 and the supercooling part 8 are integrally formed with each other. Although not shown in the drawing, the condensing part 7 and the supercooling part 8 may be formed as separate members from each other, and a condenser with a supercooling part may be constituted by combining the condensing part 7 and the supercooling part 8.

The refrigeration cycle 1 also includes an internal heat exchanger 25 on a circulation path of the refrigerant. The internal heat exchanger 25 includes a first heat exchanging part through which the refrigerant introduced into the decompression and expansion device 4 from the condenser 3 flows, and a second heat exchanging part 27 through which the refrigerant introduced into a suction side of the compressor 2 from the evaporator 5 flows, and can perform a heat exchange between a relatively high-temperature refrigerant which flows through the first heat exchanging part 26 and a relatively low-temperature refrigerant which flows through the second heat exchanging part 27. As shown in FIG. 1, assuming a refrigerant temperature value on an inlet side of the first heat exchanging part 26 as T1, a refrigerant temperature value on an outlet side of the first heat exchanging part 26 as T2, a refrigerant temperature value on an outlet side of the second heat exchanging part 27 as T3, and a refrigerant temperature value on an inlet side of the second heat exchanging part 27 as T4, a rate of the heat exchange efficiency of the internal heat exchanger 25 can be introduced by the following formula (1).

$$100 \times (T3-T4)/(T1-T4) \qquad \text{[Formula 1]}$$

The refrigeration cycle 1 is constituted by suitably connecting the compressor 2, the condenser 3, the internal heat exchanger 25, the decompression and expansion device 4, and the evaporator 5 to each other by a pipe 6. A high-pressure line 1A is constituted of a passage through which the refrigerant reaches an inflow side of the decompression and expansion device from the compressor 2, and a low-pressure line 1B is constituted of a passage through which the refrigerant reaches an suction side of the compressor 2 from an outflow side of the decompression and expansion device 4.

Air is supplied to the condenser 3 by a blower 24 which is positioned in front of or behind the condenser 3 in the vehicle advancing direction (in front of the condenser 3 in the vehicle advancing direction in this embodiment). The blower 24 is constituted of a fan 24a and a motor 24b which rotates the fan 24a.

In a refrigeration cycle which includes the condenser 3 with the supercooling part 8 but not the internal heat exchanger 25 (hereinafter referred to as a conventional refrigeration cycle), a refrigerant repeats a change of state expressed by A1→B2→C2→D2→A1 shown in FIG. 3. On the other hand, in the refrigeration cycle 1 which includes both the condenser 3 with a supercooling part and the internal heat exchanger 25 shown in FIG. 1, the refrigerant repeats a change of state expressed by A1→ A2→ B1→C2→C3→D1→A1 shown in FIG. 3.

Figure 3:
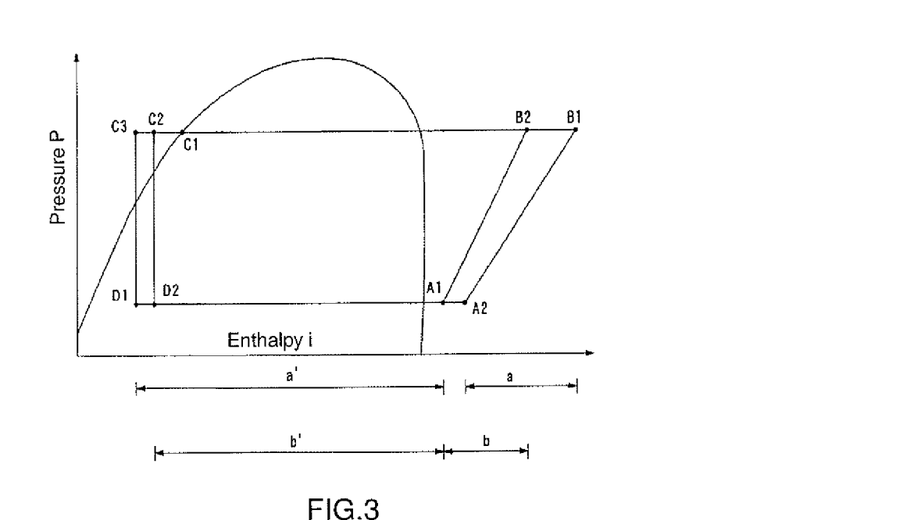
FIG. 3 is a Mollier chart on which the refrigeration cycle is described together with a conventional refrigeration cycle.

When the refrigerant (A1) flown out from the evaporator 5 passes through the second heat exchanging part 27 in the internal heat exchanger 25, the refrigerant (A1) is heated by a relatively high-temperature refrigerant which flows into the decompression and expansion device 4 from the condenser 3 so that an enthalpy of the refrigerant (A1) is increased whereby the refrigerant on a suction side of the compressor 2 takes the state A2 shown in FIG. 3. Then, the refrigerant is compressed by the compressor 2 and the refrigerant discharged from the compressor 2 takes the state B1. It has been known that a change of state similar to an isentropic line occurs in the refrigerant in this compression process, and the difference in enthalpy between the states A2, B1 becomes larger than the difference in enthalpy between the states A1, B2. Then, the refrigerant is cooled by the condensing part 7 of the condenser 3, and is condensed to a value on a saturated liquid line thus taking the state C1. Then, the refrigerant is cooled also by the supercooling part 8 of the condenser 3 thus taking the state C2, and is flown out from the condenser 3.

Thereafter, when the refrigerant passes through the first heat exchanging part 26 in the internal heat exchanger 25, the refrigerant is cooled by a heat exchange between the refrigerant and the refrigerant which flows through the second heat exchanging part 27 thus taking the state C3. Then, the refrigerant takes the state D1 due to lowering of a pressure thereof in the decompression and expansion device 4, the refrigerant absorbs a heat at the evaporator 5, and the refrigerant takes the state A1 again when the refrigerant is flown out from the evaporator 5.

Accordingly, as shown in FIG. 3, a power amount "a" of the compressor 2 in the refrigeration cycle 1 becomes large compared with a power amount "b" of the compressor 2 in a conventional refrigeration cycle, and also a refrigerating capacity a' of the refrigeration cycle 1 becomes large compared with a refrigerating capacity b' of the conventional refrigeration cycle. A coefficient of performance (COP) of the refrigeration cycle of the invention expressed as a'/a includes an element by which power of the compressor 2 is increased by an amount of a-b so that the coefficient of performance becomes small, and an element by which a cooling capacity is increased by an amount of a'-b' so that the coefficient of performance becomes large and hence, it is not always a case that the coefficient of performance becomes large compared to the coefficient of performance of the conventional refrigeration cycle.

Figure 4:
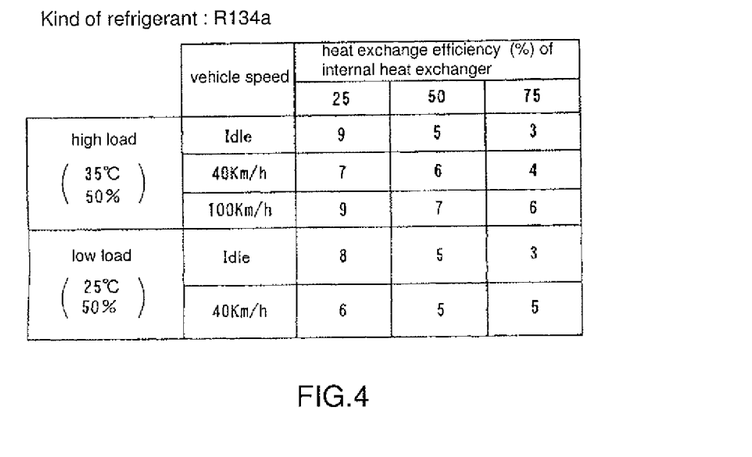
FIG. 4 is a view showing rates of the supercooling part introduced based on various conditions such as a vehicle speed and heat exchange efficiency of the internal heat exchanger under a high-load condition and a low-load condition when an R134a refrigerant is used as a kind of a refrigerant.

The coefficient of performance (COP) has a local maximum point (maximum efficiency point). In the case where R134a is used as a kind of refrigerant, under an environmental condition of high load (air temperature: 35° C., relative humidity: 50%), three conditions consisting of an idling state (Idle state), 40 km/h, and 100 km/h are set with respect to a vehicle speed, and three conditions consisting of 25%, 50% and 75% are set with respect to heat exchange efficiency of the internal heat exchanger 25. A rate (%) at which the supercooling part 8 occupies with respect to the condenser 3 where the coefficient of performance (COP) becomes the maximum efficiency under the combination of both conditions is measured, and a result described in an upper column of a chart shown in FIG. 4 is obtained. The load of air is set such that an air temperature is 35° C. and relative humidity is 50% by estimating an air condition in summer where a refrigeration cycle is frequently used. The above-mentioned three conditions are set with respect to the vehicle speed by estimating a traffic jam, traveling in a town or a city and high-speed traveling respectively. The above-mentioned three conditions are set with respect to the heat exchange efficiency of the internal heat exchanger 25 by estimating the heat exchange efficiency of a heat exchanger having high heat exchange performance in addition to the heat exchange efficiency of the internal heat exchanger 25 which is used in general as a vehicle air conditioning unit.

That is, the maximum efficiency point of the coefficient of performance (COP) is acquired when the rate of the supercooling part 8 is 9% in the case where the vehicle speed is set in an idling state (indicated by idle in FIG. 4) and the heat exchange efficiency of the internal heat exchanger 25 is 25%, is acquired when the rate of the supercooling part 8 is 5% in the case where the vehicle speed is set in the idling state and the heat exchange efficiency of the internal heat exchanger 25 is 50%, and is acquired when the rate of the supercooling part 8 is 3% in the case where the vehicle speed is set in the idling state and the heat exchange efficiency of the internal heat exchanger 25 is 75%. The maximum efficiency point of the coefficient of performance (COP) is acquired when the rate of the supercooling part 8 is 7% in the case where the vehicle speed is set to 40 km/h and the heat exchange efficiency of the internal heat exchanger 25 is 25%, is acquired when the rate of the supercooling part 8 is 6% in the case where the vehicle speed is set to 40 km/h and the heat exchange efficiency of the internal heat exchanger 25 is 50%, and is acquired when the rate of the supercooling part 8 is 4% in the case where the vehicle speed is set to 40 km/h and the heat exchange efficiency of the internal heat exchanger 25 is 75%. The maximum efficiency point of the coefficient of performance (COP) is acquired when the rate of the supercooling part 8 is 9% in the case where the vehicle speed is set to 100 km/h and the heat exchange efficiency of the internal heat exchanger 25 is 25%, is acquired when the rate of the supercooling part 8 is 7% in the case where the vehicle speed is set to 100 km/h and the heat exchange efficiency of the internal heat exchanger 25 is 50%, and is acquired when the rate of the supercooling part 8 is 6% in the case where the vehicle speed is set to 100 km/h and the heat exchange efficiency of the internal heat exchanger 25 is 75%.

Further, in the case where R134a is used as a kind of refrigerant, under an environmental condition of low load (air temperature: 25° C., relative humidity: 50%), two conditions consisting of an idling state (Idle state) and 40 km/h are set with respect to a vehicle speed, and three conditions consisting of 25%, 50% and 75% are set with respect to heat exchange efficiency of the internal heat exchanger 25. A rate (%) at which the supercooling part 8 occupies with respect to the condenser 3 where the coefficient of performance (COP) becomes the maximum efficiency under the combination of both conditions is measured, and a result described in a lower column of the chart shown in FIG. 4 is obtained. The load of air is set such that an air temperature is 25° C. and relative humidity is 50% by estimating an air condition in an intermediate period where the use of the refrigeration cycle starts. The above-mentioned two conditions are set with respect to the vehicle speed by estimating a traffic jam and traveling in a town or a city respectively. The reason the condition of 100 km/h with respect to the vehicle speed is deleted is as follows. That is, when high speed traveling is performed under a low load environment, a freezing prevention control for the vaporizer 5 is started by a control unit or the like which performs an ON/OFF control of the compressor 2 based on the temperature detected by a temperature detection means mounted for preventing freezing of the vaporizer 5 which is provided to a refrigeration cycle in general so that the operation of the refrigeration cycle is performed intermittently whereby the measurement of the maximum efficiency point of the coefficient of performance is difficult. The above-mentioned three conditions are set with respect to the heat exchange efficiency of the internal heat exchanger 25 by estimating the heat exchange efficiency of a heat exchanger having high heat exchange performance in addition to the heat exchange efficiency of the internal heat exchanger 25 which is used in general as a vehicle air conditioning unit.

That is, the maximum efficiency point of the coefficient of performance (COP) is acquired when the rate of the supercooling part 8 is 8% in the case where the vehicle speed is set in an idle state and the heat exchange efficiency of the internal heat exchanger 25 is 25%, is acquired when the rate of the supercooling part 8 is 5% in the case where the vehicle speed is set in the idle state and the heat exchange efficiency of the internal heat exchanger 25 is 50%, and is acquired when the rate of the supercooling part 8 is 3% in the case where the vehicle speed is set in the idle state and the heat exchange efficiency of the internal heat exchanger 25 is 75%. The maximum efficiency point of the coefficient of performance (COP) is acquired when the rate of the supercooling part 8 is 6% in the case where the vehicle speed is set to 40 km/h and the heat exchange efficiency of the internal heat exchanger 25 is 25%, is acquired when the rate of the supercooling part 8 is 5% in the case where the vehicle speed is set to 40 km/h and the heat exchange efficiency of the internal heat exchanger 25 is 50%, and is acquired when the rate of the supercooling part 8 is 5% in the case where the vehicle speed is set to 40 km/h and the heat exchange efficiency of the internal heat exchanger 25 is 75%.

Here, when R134a is used as a kind of refrigerant, an upper limit value of the rate of the supercooling part 8 at which the coefficient of performance (COP) exhibits the maximum efficiency point is 9%, and a lower limit value of the rate of the supercooling part 8 at which the coefficient of performance (COP) exhibits the maximum efficiency point is 3%.

Figure 5:
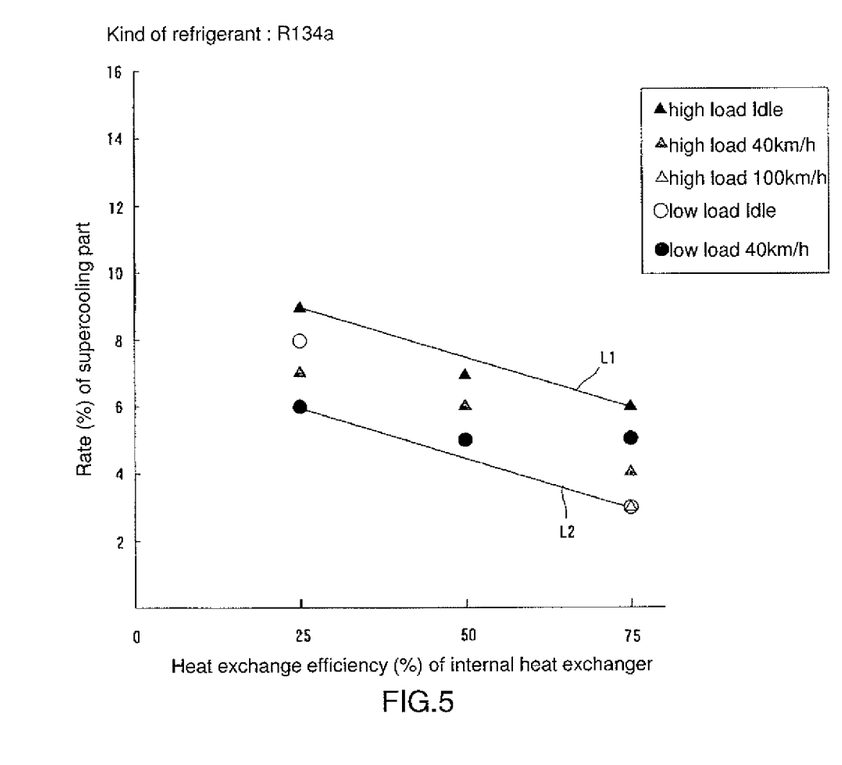
FIG. 5 is a view showing a change in a rate of the supercooling part when an R134a refrigerant is used in the case where the rate of the supercooling part at which the coefficient of performance becomes maximum efficiency is taken on an axis of ordinates, and heat exchange efficiency of the internal heat exchanger is taken on an axis of abscissas.

Next, when the rate (%) of the supercooling part 8 at which the coefficient of performance (COP) exhibits the maximum efficiency point under the above-mentioned conditions is taken on an axis of ordinates, and the above-mentioned three heat exchange efficiencies (%) of the internal heat exchanger 25 are taken on an axis of abscissas, these numerical values are expressed as characteristic curves shown in FIG. 5. To look at the distribution of points indicative of the rates of the respective supercooling parts 8, the dots fall within a width between an upper imaginary straight line L1 and a lower imaginary straight line L2. Assuming a value of heat exchange efficiency of the internal heat exchanger 25 as X and a value of the rate at which the supercooling part 8 occupies with respect to the condenser 3 as Y, the imaginary straight line L1 passes a coordinate point of (heat exchange efficiency of internal heat exchanger 25: 25%, rate of supercooling part 8: 9%) and a coordinate point of (heat exchange efficiency of internal heat exchanger 25: 75%, rate of supercooling part 8: 6%), and the imaginary straight line L2 passes a coordinate point of (heat exchange efficiency of internal heat exchanger 25: 25%, rate of supercooling part 8: 6%) and a coordinate point of (heat exchange efficiency of internal heat exchanger 25: 75%, rate of supercooling part 8: 3%). Accordingly, by setting the value of the rate of the supercooling part 8 such that the value is expressed by the following formula (2) using a formula for introducing a straight line which passes two points, the rate of the supercooling part 8 can be set to a percentage which falls within the width between the upper imaginary straight line L1 and the lower imaginary straight line L2, that is, the percentage at which the maximum efficiency point of the coefficient of performance (COP) is acquired. Accordingly, when R134a is used as the refrigerant, by setting the rate of the supercooling part 8 to a value which falls within a range set by the following formula (2), it is possible to surely acquire a higher refrigerating capacity with less power of the compressor 2 and hence, an amount of refrigerant can be also reduced.

$$-(3/50)X+15/2 \leq Y \leq -(3/50)X+21/2 \quad \text{[Formula 2]}$$

Figure 6:
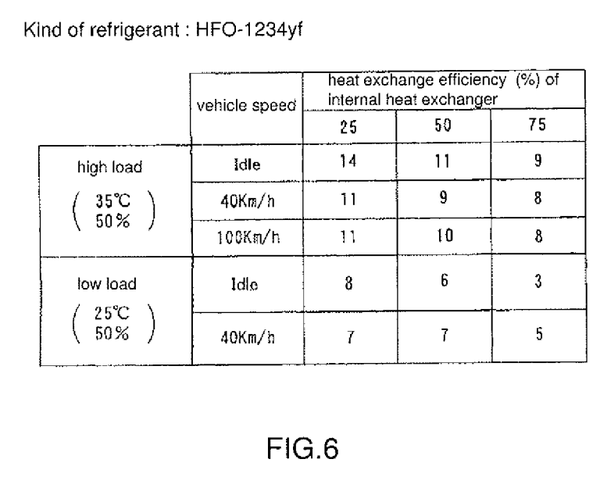
FIG. 6 is a view showing rates of the supercooling part introduced based on various conditions such as a vehicle speed and heat exchange efficiency of the internal heat exchanger under a high-load condition and a low-load condition when an HFO-1234yf refrigerant is used as a kind of refrigerant.

On the other hand, in the case where HFO-1234yf is used as a kind of refrigerant, under an environmental condition of high load (air temperature: 35° C., relative humidity: 50%), three conditions consisting of an idling state (Idle state), 40 km/h, and 100 km/h are set with respect to a vehicle speed, and three conditions consisting of 25%, 50% and 75% are set with respect to heat exchange efficiency of the internal heat exchanger 25. A rate (%) at which the supercooling part 8 occupies with respect to the condenser 3 where the coefficient of performance (COP) becomes the maximum efficiency under the combination of both conditions is measured, and a result described in an upper column of the chart shown in FIG. 6 is obtained.

That is, the maximum efficiency point of the coefficient of performance (COP) is acquired when the rate of the supercooling part 8 is 14% in the case where the vehicle speed is set in an idling state (indicated by idle in FIG. 6) and the heat exchange efficiency of the internal heat exchanger 25 is 25%, is acquired when the rate of the supercooling part 8 is 11% in the case where the vehicle speed is set in the idling state and the heat exchange efficiency of the internal heat exchanger 25 is 50%, and is acquired when the rate of the supercooling part 8 is 9% in the case where the vehicle speed is set in the idling state and the heat exchange efficiency of the internal heat exchanger 25 is 75%. The maximum efficiency point of the coefficient of performance (COP) is acquired when the rate of the supercooling part 8 is 11% in the case where the vehicle speed is set to 40 km/h and the heat exchange efficiency of the internal heat exchanger 25 is 25%, is acquired when the rate of the supercooling part 8 is 9% in the case where the vehicle speed is set to 40 km/h and the heat exchange efficiency of the internal heat exchanger 25 is 50%, and is acquired when the rate of the supercooling part 8 is 8% in the case where the vehicle speed is set to 40 km/h and the heat exchange efficiency of the internal heat exchanger 25 is 75%. The maximum efficiency point of the coefficient of performance (COP) is acquired when the rate of the supercooling part 8 is 11% in the case where the vehicle speed is set to 100 km/h and the heat exchange efficiency of the internal heat exchanger 25 is 25%, is acquired when the rate of the supercooling part 8 is 10% in the case where the vehicle speed is set to 100 km/h and the heat exchange efficiency of the internal heat exchanger 25 is 50%, and is acquired when the rate of the supercooling part 8 is 8% in the case where the vehicle speed is set to 100 km/h and the heat exchange efficiency of the internal heat exchanger 25 is 75%.

Further, in the case where HFO-1234yf is used as a kind of refrigerant, under an environmental condition of low load (air temperature: 25° C., relative humidity: 50%), two conditions consisting of an idling state (Idle state) and 40 km/h are set with respect to a vehicle speed, and three conditions consisting of 25%, 50% and 75% are set with respect to heat exchange efficiency of the internal heat exchanger 25. A rate (%) at which the supercooling part 8 occupies with respect to the condenser 3 where the coefficient of performance (COP) becomes the maximum efficiency under the combination of both conditions is measured, and a result described in a lower column of the chart shown in FIG. 6 is obtained.

That is, the maximum efficiency point of the coefficient of performance (COP) is acquired when the rate of the supercooling part 8 is 8% in the case where the vehicle speed is set in an idle state and the heat exchange efficiency of the internal heat exchanger 25 is 25%, is acquired when the rate of the supercooling part 8 is 6% in the case where the vehicle speed is set in the idle state and the heat exchange efficiency of the internal heat exchanger 25 is 50%, and is acquired when the rate of the supercooling part 8 is 3% in the case where the vehicle speed is set in the idle state and the heat exchange efficiency of the internal heat exchanger 25 is 75%. The maximum efficiency point of the coefficient of performance (COP) is acquired when the rate of the supercooling part 8 is 7% in the case where the vehicle speed is set to 40 km/h and the heat exchange efficiency of the internal heat exchanger 25 is 25%, is acquired when the rate of the supercooling part 8 is 7% in the case where the vehicle speed is set to 40 km/h and the heat exchange efficiency of the internal heat exchanger 25 is 50%, and is acquired when the rate of the supercooling part 8 is 5% in the case where the vehicle speed is set to 40 km/h and the heat exchange efficiency of the internal heat exchanger 25 is 75%.

Here, when HFO-1234yf is used as a kind of refrigerant, an upper limit value of the rate of the supercooling part 8 at which the coefficient of performance (COP) exhibits the maximum efficiency point is 14%, and when HFO-1234yf is used as a kind of refrigerant, a lower limit value of the rate of the supercooling part 8 at which the coefficient of performance (COP) exhibits the maximum efficiency point is 3%.

Figure 7:
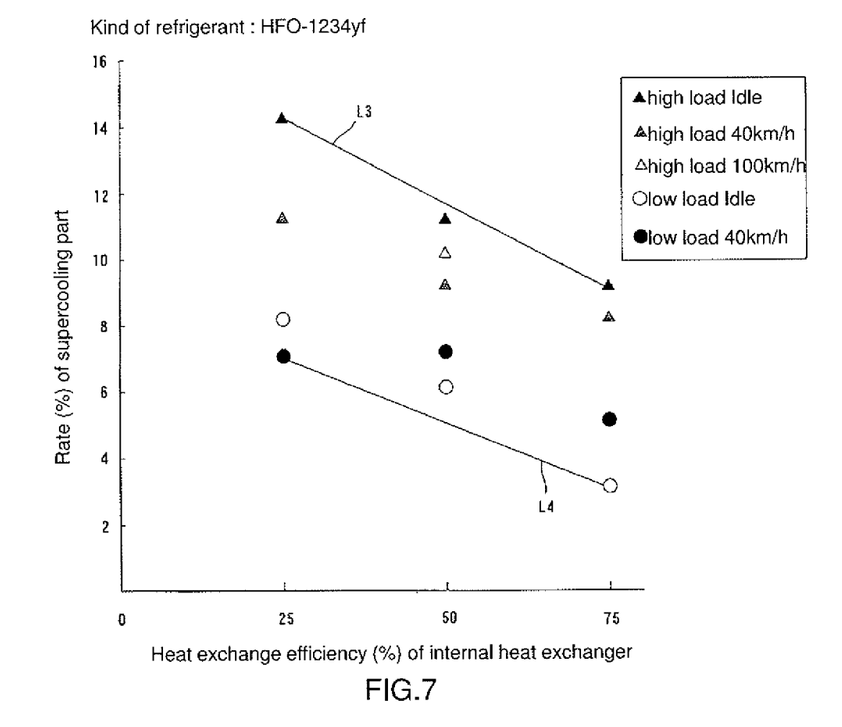
FIG. 7 is a view showing a change in a rate of the supercooling part when the HFO-1234yf refrigerant is used in the case where the rate of the supercooling part at which the coefficient of performance becomes maximum efficiency is taken on an axis of ordinates, and heat exchange efficiency of the internal heat exchanger is taken on an axis of abscissas.

Next, when the rate (%) of the supercooling part 8 at which the coefficient of performance (COP) exhibits the maximum efficiency point under the above-mentioned conditions is taken on an axis of ordinates, and the above-mentioned three heat exchange efficiencies (%) of the internal heat exchanger 25 are taken on an axis of abscissas, these numerical values are expressed as characteristic curves shown in FIG. 7. To look at the distribution of points indicative of the rates of the respective supercooling parts 8, the dots fall within a width between an upper imaginary straight line L3 and a lower imaginary straight line L4. Assuming a value of heat exchange efficiency of the internal heat exchanger 25 as X and a value of the rate at which the supercooling part 8 occupies with respect to the condenser 3 as Y, the imaginary straight line L3 passes a coordinate point of (heat exchange efficiency of internal heat exchanger 25: 25%, rate of supercooling part 8: 14%) and a coordinate point of (heat exchange efficiency of internal heat exchanger 25: 75%, rate of supercooling part 8: 9%), and the imaginary straight line L4 passes a coordinate point of (heat exchange efficiency of internal heat exchanger 25: 25%, rate of supercooling part 8: 7%) and a coordinate point of (heat exchange efficiency of internal heat exchanger 25: 75%, rate of supercooling part 8: 3%). Accordingly, by setting the value of the rate of the supercooling part 8 such that the value is expressed by the following formula (3) using a formula for introducing a straight line which passes two points, the rate of the supercooling part 8 can be set to a percentage which falls within the width between the upper imaginary straight line L3 and the lower imaginary straight line L4, that is, the percentage at which the maximum efficiency point of the coefficient of performance (COP) is acquired. Accordingly, when HFO-1234yf is used as the refrigerant, by setting the rate of the supercooling part 8 to a value which falls within a range set by the following formula (3), it is possible to surely acquire a higher refrigerating capacity with less power of the compressor 2 and hence, an amount of refrigerant can be also reduced.

$$-(4/50)X+18/2 \le Y \le -(5/50)X+33/2 \qquad \text{[Formula 3]}$$

REFERENCE SIGNS LIST

1: refrigeration cycle
2: compressor
3: condenser
4: decompression and expansion device
5: evaporator
6: pipe
7: condensing part
8: supercooling part
9: gas/liquid separation part
10: inlet portion
11: outlet portion
12: tube
13: fin
14: core
15: tank
15a: tank portion
15b: tank portion
16: tank 16a: tank portion
16b: tank portion
16c: tank portion
17: partition portion
18: partition portion
19: connector
20: partition portion
21: partition portion
22: outflow portion
23: inflow portion
24: blower
24a: fan
24b: motor
25: internal heat exchanger
26: first heat exchanging part
27: second heat exchanging part

The invention claimed is:

1. A refrigeration cycle (1) comprises a compressor (2) which compresses a refrigerant, a condenser (3) which condenses the compressed refrigerant, a decompression and expansion device (4) which decompresses and expands the condensed refrigerant, and an evaporator (5) which evaporates the decompressed and expanded refrigerant, wherein the compressor (2), the condenser (3), the device (4), and the evaporator (5) are each joined to each other by piping, and wherein the condenser (3) is formed of a condenser with a supercooling part, the condenser (3) including a condensing part (7) which is arranged on an upstream side in the flow of the refrigerant and condenses the refrigerant by cooling, and a supercooling part (8) which is arranged downstream of the condensing part in the flow of the refrigerant and further cools the refrigerant, the refrigeration cycle (1) further comprises an internal heat exchanger (25) which includes a first heat exchanging part (26) through which the refrigerant introduced into the decompression and expansion device (4) from the condenser (3) flows, and a second heat exchanging part (27) through which the refrigerant introduced into a suction side of the compressor (2) from the evaporator (5) passes, and performs a heat exchange between a relatively high-temperature refrigerant which flows through the first heat exchanging part (26) and a relatively low-temperature refrigerant which flows through the second heat exchanging part (27), and a rate at which the supercooling part (8) occupies with respect to the whole condenser (3) is set based on a maximum efficiency point of a coefficient of performance of the refrigeration cycle introduced based on an outside air load, a vehicle speed and a heat exchange efficiency which the internal heat exchanger (25) has.

2. The refrigeration cycle (1) according to claim 1, wherein the maximum efficiency points of the coefficient of performance of the refrigeration cycle (1) are introduced respectively based on a plurality of different outside air loads, a plurality of different vehicle speeds and a plurality of heat exchange efficiencies which the internal heat exchanger (25) has respectively, and the rate at which the supercooling part (8) occupies with respect to the whole condenser (3) is set based on a value which falls within a range of respectively introduced maximum efficient points.

3. The refrigeration cycle (1) according to claim 1, wherein the plurality of different outside air loads include a condition where an outside air temperature is 25° C. and a relative humidity is 50% at a relatively low load and a condition where an outside air temperature is 35° C. and a relative humidity is 50% at a relatively high load, the plurality of different vehicle speeds include a condition where a driving state is an idling state and the vehicle speed is 40 km/h at the relatively low load and a condition where the driving state is an idling state and the vehicle speed is 40 km/h and 100 km/h at the relatively high load, and the plurality of different heat exchange efficiencies which the internal heat exchanger (25) has respectively include a condition where the heat exchange efficiency is 25%, a condition where the heat exchange efficiency is 50% and a condition where the heat exchange efficiency is 75%, and assuming a refrigerant temperature value on an inlet side of the first heat exchanging part (26) as T1, a refrigerant temperature value on an outlet side of the first heat exchanging part (26) as T2, a refrigerant temperature value on an outlet side of the second heat exchanging part (27) as T3, and a refrigerant temperature value on an inlet side of the second heat exchanging part (27) as T4, the heat exchange efficiency is introduced by the following formula (1)

$$100 \times (T3-T4)/(T1-T4). \quad \text{[Formula 1]}$$

4. The refrigeration cycle (1) according to claim 1, wherein an R134a refrigerant or an HFO-1234yf refrigerant is used as the refrigerant which flows through the refrigeration cycle (1).

5. A refrigeration cycle (1) comprising a compressor (2) which compresses a refrigerant, a condenser (3) which condenses the compressed refrigerant, a decompression and expansion device (4) which decompresses and expands the condensed refrigerant, and an evaporator (5) which evaporates the decompressed and expanded refrigerant, wherein the compressor (2), the condenser (3), the device (4), and the evaporator (5) are each joined to each other by piping, and wherein an R134a refrigerant is used as the refrigerant which flows through the refrigeration cycle (1), the condenser (3) is formed of a condenser with a supercooling part, the condenser (3) including a condensing part (7) which is arranged on an upstream side in the flow of the refrigerant and condenses the refrigerant by cooling, and a supercooling part (8) which is arranged downstream of the condensing part in the flow of the refrigerant and further cools the refrigerant, the refrigeration cycle (1) further comprises an internal heat exchanger (25) which includes a first heat exchanging part (26) through which the refrigerant introduced into the decompression and expansion device (4) from the condenser (3) flows, and a second heat exchanging part (27) through which the refrigerant introduced into a suction side of the compressor (2) from the evaporator (5) passes, and performs a heat exchange between a relatively high-temperature refrigerant which flows through the first heat exchanging part (26) and a relatively low-temperature refrigerant which flows through the second heat exchanging part (27), and assuming a value of the heat exchange efficiency of the internal heat exchanger (25) as X and a value of a rate at which the supercooling part (8) occupies with respect to the condenser (3) as Y, the rate of the supercooling part (8) is set to be expressed by the following formula (2)

$$-(3/50)X+15/2 \leq Y \leq (3/50)X+21/2. \quad \text{[Formula 2]}$$

6. A refrigeration cycle (1) comprising a compressor (2) which compresses a refrigerant, a condenser (3) which condenses the compressed refrigerant, a decompression and expansion device (4) which decompresses and expands the condensed refrigerant, and an evaporator (5) which evaporates the decompressed and expanded refrigerant to each other by piping, wherein the compressor (2), the condenser (3), the device (4), and the evaporator (5) are each joined to each other by piping, and wherein an HFO-1234yf refrigerant is used as the refrigerant which flows through the refrigeration cycle (1), the condenser (3) is formed of a condenser with a supercooling part, the condenser (3) including a condensing part (7) which is arranged on an upstream side in the flow of the refrigerant and condenses the refrigerant by cooling, and a supercooling part (8) which is arranged downstream of the condensing part (7) in the flow of the refrigerant and further cools the refrigerant, the refrigeration cycle (1) further comprises an internal heat exchanger (25) which includes a first heat exchanging part (26) through which the refrigerant introduced into the decompression and expansion device (4) from the condenser (3) flows, and a second heat exchanging part (27) through which the refrigerant introduced into a suction side of the compressor (2) from the evaporator (5) passes, and performs a heat exchange between a relatively high-temperature refrigerant which flows through the first heat exchanging part (26) and a relatively low-temperature refrigerant which flows through the second heat exchanging part (27), and assuming a value of the heat exchange efficiency of the internal heat exchanger (25) as X and a value of a rate at which the supercooling part (8) occupies with respect to the condenser (3) as Y, a value of the rate of the supercooling part (8) is set to be expressed by the following formula (3)

$(4/50)X+18/2 \leq Y \leq -(5/50)X+33/2.$ [Formula 3]

7. A refrigeration cycle (1) comprises a compressor (2) which compresses a refrigerant, a condenser (3) which condenses the compressed refrigerant, a decompression and expansion device (4) which decompresses and expands the condensed refrigerant, and an evaporator (5) which evaporates the decompressed and expanded refrigerant, wherein the compressor (2), the condenser (3), the device (4), and the evaporator (5) are each joined to each other by piping, and wherein an R134a refrigerant is used as the refrigerant which flows through the refrigeration cycle (1), the condenser (3) is formed of a condenser with a supercooling part, the condenser (3) including a condensing part (7) which is arranged on an upstream side in the flow of the refrigerant and condenses the refrigerant by cooling, and a supercooling part (8) which is arranged downstream of the condensing part (7) in the flow of the refrigerant and further cools the refrigerant, the refrigeration cycle (1) further comprises an internal heat exchanger (25) which includes a first heat exchanging part (26) through which the refrigerant introduced into the decompression and expansion device (4) from the condenser (3) flows, and a second heat exchanging part (27) through which the refrigerant introduced into a suction side of the compressor (2) from the evaporator (5) passes, and performs a heat exchange between a relatively high-temperature refrigerant which flows through the first heat exchanging part (7) and a relatively low-temperature refrigerant which flows through the second heat exchanging part (27), and a rate at which the supercooling part (8) occupies with respect to the whole condenser (3) falls within a range of 3% to 9% when the heat exchange efficiency of the internal heat exchanger (25) falls within a range of 25% to 75%.

8. A refrigeration cycle (1) comprises a compressor (2) which compresses a refrigerant, a condenser (3) which condenses the compressed refrigerant, a decompression and expansion device (4) which decompresses and expands the condensed refrigerant, and an evaporator (5) which evaporates the decompressed and expanded refrigerant to each other by piping, wherein the compressor (2), the condenser (3), the device (4), and the evaporator (5) are each joined to each other by piping, and wherein an HFO-1234yf refrigerant is used as the refrigerant which flows through the refrigeration cycle (1), the condenser (3) is formed of a condenser with a supercooling part, the condenser (3) including a condensing part (7) which is arranged on an upstream side in the flow of the refrigerant and condenses the refrigerant by cooling, and a supercooling part (8) which is arranged downstream of the condensing part (7) in the flow of the refrigerant and further cools the refrigerant, the refrigeration cycle (1) further comprises an internal heat exchanger (25) which includes a first heat exchanging part (26) through which the refrigerant introduced into the decompression and expansion device (4) from the condenser (3) flows, and a second heat exchanging part (27) through which the refrigerant introduced into a suction side of the compressor (2) from the evaporator (5) passes, and performs a heat exchange between a relatively high-temperature refrigerant which flows through the first heat exchanging part (26) and a relatively low-temperature refrigerant which flows through the second heat exchanging part (27), and a rate at which the supercooling part (8) occupies with respect to the whole condenser (3) falls within a range of 3% to 14% when the heat exchange efficiency of the internal heat exchanger (25) falls within a range of 25% to 75%.

9. A condenser (3) with a supercooling part (8) for condensing a compressed refrigerant, the condenser (3) constituting a refrigeration cycle (1) comprising a compressor (2) which compresses the refrigerant, a decompression and expansion device (4) which decompresses and expands the condensed refrigerant, an evaporator (5) which evaporates the decompressed and expanded refrigerant, and an internal heat exchanger (25) which includes a first heat exchanging part (26) and a second heat exchanging part (27), and performs a heat exchange between a relatively high-temperature refrigerant which flows through the first heat exchanging part (26) and a relatively low-temperature refrigerant which flows through the second heat exchanging part (27), wherein the compressor (2), the device (4), the evaporator (5), and the heat exchanger (25) are each connected to each other by piping, and wherein the condenser (3) includes a condensing part (7) which is arranged on an upstream side in the flow of the refrigerant and condenses the refrigerant by cooling, and a supercooling part (8) which is arranged downstream of the condensing part (7) in the flow of the refrigerant and further cools the refrigerant, and maximum efficiency points of a coefficient of performance of the refrigeration cycle are respectively introduced based on a plurality of different outside loads, a plurality of different vehicle speeds and a plurality of heat exchange efficiencies which the internal heat exchanger (25) has respectively, and the rate at which the supercooling part (8) occupies with respect to the whole condenser (3) is set based on values which fall within ranges of respectively introduced maximum efficient points.

10. The refrigeration cycle (1) according to claim 2, wherein the plurality of different outside air loads include a condition where an outside air temperature is 25° C. and a relative humidity is 50% at a relatively low load and a condition where an outside air temperature is 35° C. and a relative humidity is 50% at a relatively high load, the plurality of different vehicle speeds include a condition where a driving state is an idling state and the vehicle speed is 40 km/h at the relatively low load and a condition where the driving state is an idling state and the vehicle speed is 40 km/h and 100 km/h at the relatively high load, and the plurality of different heat exchange efficiencies which the internal heat exchanger (25) has respectively include a condition where the heat exchange efficiency is 25%, a condition where the heat exchange efficiency is 50% and a condition where the heat exchange efficiency is 75%, and assuming a refrigerant temperature value on an inlet side of the first heat exchanging part (26) as $T1$, a refrigerant temperature value on an outlet side of the first heat exchanging part (26) as $T2$, a refrigerant temperature value on an outlet side of the second heat exchanging part (27) as $T3$, and a refrigerant temperature value on an inlet side of the second heat exchanging part (27) as $T4$, the heat exchange efficiency is introduced by the following formula (1)

$$100 \times (T3-T4)/(T1-T4). \quad \text{[Formula 1]}$$

11. The refrigeration cycle (1) according to claim 2, wherein an R134a refrigerant or an HFO-1234yf refrigerant is used as the refrigerant which flows through the refrigeration cycle (1).

12. The refrigeration cycle (1) according to claim 3, wherein an R134a refrigerant or an HFO-1234yf refrigerant is used as the refrigerant which flows through the refrigeration cycle (1).

* * * * *

UNITED STATES PATENT AND TRADEMARK OFFICE
CERTIFICATE OF CORRECTION

PATENT NO. : 9,134,057 B2  
APPLICATION NO. : 13/880693  
DATED : September 15, 2015  
INVENTOR(S) : Kenji Iijima Page 1 of 1

It is certified that error appears in the above-identified patent and that said Letters Patent is hereby corrected as shown below:

IN THE CLAIMS:

Column 16, line 67, please delete "-(3/50)X+15/2≤Y≤(3/50)X+21/2" before "[Formula 2]" and replace with -- -(3/50)X+15/2≤Y≤-(3/50)X+21/2--

Column 17, line 6, please delete "refrigerant to each other by piping," before "wherein" and replace with --refrigerant,--

Column 17, line 39, please delete "(4/50)X+18/2≤Y≤-(5/50)X+33/2" before "[Formula 3]" and replace with -- -(4/50)X+18/2≤Y≤-(5/50)X+33/2--

Signed and Sealed this  
Fifteenth Day of March, 2016

Michelle K. Lee  
*Director of the United States Patent and Trademark Office*